(12) United States Patent
Boys et al.

(10) Patent No.: US 8,909,148 B2
(45) Date of Patent: Dec. 9, 2014

(54) COMMUNICATIONS SYSTEM

(75) Inventors: John Talbot Boys, Auckland (NZ);
Edward Van Boheemen, Auckland (NZ)

(73) Assignee: Auckland Uniservices Limited (NZ)

( * ) Notice: Subject to any disclaimer, the term of this patent is extended or adjusted under 35 U.S.C. 154(b) by 549 days.

(21) Appl. No.: 12/734,463

(22) PCT Filed: Oct. 31, 2008

(86) PCT No.: PCT/NZ2008/000295
§ 371 (c)(1),
(2), (4) Date: Dec. 27, 2010

(87) PCT Pub. No.: WO2009/058036
PCT Pub. Date: May 7, 2009

(65) Prior Publication Data
US 2011/0105020 A1 May 5, 2011

(30) Foreign Application Priority Data

Nov. 2, 2007 (NZ) ........................... 563105

(51) Int. Cl.
*H04B 5/00* (2006.01)
(52) U.S. Cl.
CPC ............ *H04B 5/0018* (2013.01); *H04B 5/0031* (2013.01)
USPC .................................................... 455/41.2
(58) Field of Classification Search
CPC .................. H04B 5/0018; H04B 5/0031
USPC .................................................... 455/41.1
See application file for complete search history.

(56) References Cited

U.S. PATENT DOCUMENTS

| 3,629,707 | A | | 12/1971 | Baba et al. |
| 4,428,078 | A | | 1/1984 | Kuo |
| 5,455,466 | A | * | 10/1995 | Parks et al. .................... 307/104 |
| 6,005,475 | A | | 12/1999 | Takasan et al. |
| 7,019,620 | B2 | * | 3/2006 | Bohler et al. .............. 340/12.38 |
| 7,023,301 | B2 | * | 4/2006 | Kawahara et al. ............. 333/204 |
| 2002/0183003 | A1 | * | 12/2002 | Chang et al. ..................... 455/41 |
| 2004/0204077 | A1 | * | 10/2004 | Ballai ............................ 455/557 |
| 2007/0222609 | A1 | * | 9/2007 | Duron et al. ............... 340/572.7 |
| 2007/0281625 | A1 | * | 12/2007 | Boys ............................... 455/73 |
| 2009/0227205 | A1 | * | 9/2009 | Rofougaran .................. 455/41.1 |

FOREIGN PATENT DOCUMENTS

| EP | 0442259 | 7/1994 |
| GB | 1248222 | 9/1971 |
| NZ | 545664 | 7/2008 |
| WO | 03005380 | 1/2003 |
| WO | 2005043775 | 5/2005 |
| WO | 2007109451 | 9/2007 |

* cited by examiner

*Primary Examiner* — David Bilodeau
(74) *Attorney, Agent, or Firm* — Law Office of Richard F. Jaworski, PC

(57) ABSTRACT

An apparatus for generating and/or transmitting communications signals, the apparatus including a system for generating signals at a first frequency, a system for mixing the frequency of the generated signals from the first frequency down to a second frequency and a near field antenna for receiving the signals at the second frequency and being provided sufficiently near to a wire transmission line so as to wirelessly couple thereto.

20 Claims, 4 Drawing Sheets

COMMUNICATIONS SYSTEM

FIELD OF THE INVENTION

The invention relates to communications apparatus, systems and methods, and has particular but not exclusive relevance to communication with or between one or more moveable devices.

BACKGROUND

There are many applications in which high bandwidth communication is required over a transmission line with a device that may be moveable relative to and/or along the transmission line. One example is a communications network in an environment such as a hospital where imaging equipment needs to transmit or receive high volumes of data at various locations in the hospital. It can be difficult providing appropriate physical connections between the equipment and the transmission line. This problem is compounded if the equipment needs to be moved for use around a variety of physical locations.

Inductive Power Transfer (IPT) provides a useful alternative to more conventional charging. A charger using IPT is described in New Zealand Patent Application No. 545664, entitled "Single Phase Power Supply for Inductively Coupled Power Transfer Systems" and is incorporated herein by reference. This charger provides many advantages in that it will operate from a standard single phase supply typically available in the home, has an excellent power factor and very low harmonics. As a result of this, it would be possible to operate with several thousand of these connected to a utility network without the quality of supply being degraded. Moreover, the use of IPT obviates the need for a user to manually plug in a charger. The basic components for IPT are a pickup (preferably mounted on the underside of a moveable object such as a vehicle and electrically coupled to a battery) and a charging pad (preferably provided on the ground, floor or other surface in a position directly underneath the pickup when the objector vehicle is normally stationary or parked). The charging pad is coupled to an electricity supply and when the pickup is in the correct position, the charging pad transfers power to the pickup and hence to the battery.

Another example of an application in which high bandwidth communication is required is between pick-up devices supplied with power from an energised track, such as an HID/IPT (High Efficiency Inductive Power Distribution/Inductive Power Transfer). HID/IPT systems are very popular for many practical applications. They can work in very harsh environments, as they transfer power without physical contact and are therefore tolerant of environmental hazards such as water, acids, dirt and grime. Yet they themselves produce no harmful residues. In consequence HID/IPT systems can operate in factories where they provide high reliability and immunity to paint and fumes. They can also operate in Clean Rooms where the level of cleanliness is very high and the HID/IPT system is compatible.

The ability for communication with a device powered by an HID/IPT system is becoming increasingly important. HID/IPT systems usually transfer power to devices that have a task to perform, for example the devices may be carriages which perform automated processes or which are required to travel to a selected location. The tasks that the devices are to perform can be automated to a greater degree and made far more efficient by providing a means of communication between devices and/or between each device and a system control module.

It would be preferable for a communications system for an HID/IPT system to share the same advantages as the HID/IPT system i.e., transfer information without physical contact and be tolerant of harsh environments yet produce no residues or electromagnetic interference itself.

HID/IPT systems operate in a wide range of environments where the power cables of the primary conductive path or track may be in air, or water, or even concrete. In these special circumstances it is unlikely that one particular type of communications system will be universally applicable.

In U.S. Pat. No. 6,005,475, a communications system where the HID/IPT track is tuned to two frequencies at the same time has been disclosed. This system has the advantages of low cost (as no additional conductors are required) and applicability, as wherever there is power there are communication signals as well. But the range of applicability of this technique is limited as the bandwidth that is available using pick-ups tuned to both a power frequency and a communications frequency at the same time is limited. In practice bandwidths of less than 50 kHz are to be expected. The method has the advantage that it is operable with all HID/IPT media, for example wood, concrete, water, and air. However, in many circumstances its bandwidth is simply too small.

Wider bandwidth communication systems use microwaves, for example adhering to standards such as IEEE 802.11a or b (or even g or n), but these bands may become congested and microwaves are not acceptable by many potential users of HID/IPT systems. In factory conditions microwaves can also suffer from shadowing. This means that extra diversity must be introduced which adds to spectral clutter. Wideband systems can also use leaky feeders. These are essentially distributed antennas and radiate widely making compliance with emission standards difficult when wide bandwidths are needed. Leaky feeders are also very expensive. Other communications systems economise by using the HID/IPT cables to propagate radio signals as well and have antennas distributed around the track to receive the signals. These systems are effective but leak radiation as power wires are not good RF conductors, and consequently they have a restricted bandwidth and range.

In another system, which is disclosed in International (PCT) Application No. WO 03/05380, a data cable runs alongside the primary power cable of an HID/IPT system. The conductors of the data cable are arranged in such a way as to keep coupling between the data cable and the power cable to a minimum, and therefore reduce "crosstalk". The frequency of the information signal in the data cable is typically less than 1 Megahertz and the transmission rate is about 10 to 150 kbit/s. This system requires a very specific geometric relationship between the data cable and the power cable.

WO 05/43775 describes prior art communications apparatus, systems and methods and is incorporated herein by reference. More particularly, WO 05/43775 describes the use of near field antennas combined with ribbon cable to form a high bandwidth communications channel exhibiting the advantageous characteristics of IPT systems. In these arrangements, VHF or UHF communication signals are imposed on or received from the ribbon cable using near field antennas and a separate conductor is provided for the IPT power transfer. The near field antennas may be mounted on carriages in an HID/IPT system. Other near field antennas may be positioned along the ribbon cable as desired. Thus, communications to/from the near field antennas are made via the ribbon cable as opposed to being exchanged wirelessly directly between the antennas.

Recent developments to such arrangements have included the use of 450 ohm ribbon cable in place of a more traditional 300 ohm ribbon. The 450 ohm ribbon is physically larger and when combined with new capacitive antennas the channel operates with horizontal and vertical tolerances of at least 10 mm.

However the 450 ohm ribbon cable has a much higher attenuation per meter than the 300 ohm ribbon. This is largely due to the larger physical dimensions. Also, this ribbon was originally designed for VHF frequencies up to approximately 50 MHz. As a result, the attenuation per meter is highly frequency dependant and has been measured at 0.19 dB/m at 50 MHz, 0.30 dB/m at 150 MHz, 0.35 dB/m at 250 MHz, 0.65 dB/m at 300 MHz and 0.90 dB/m at 450 MHz.

There are many industrial IPT applications now being successfully marketed. Many of these systems are based upon either monorail or ground based track systems. As a result there Is a high demand to provide a communications system which takes advantage of a ribbon cable channel and provides high bandwidths to multiple trolleys and various types of IPT systems.

SUMMARY OF THE INVENTION

As will be understood from the foregoing, most of the challenges associated with designing a high bandwidth communications system for IPT applications largely come from the specifications for such a system. In a working environment, trolleys (individual carriers running on the same track system) may queue up or disperse themselves over a large working track. Although the bandwidth demand may vary depending on the role being performed at any period of time or track location, the communications system must generally be able to provide required bandwidths at any moment since most require operation on a real-time or near real-time basis. Modern high resolution cameras, which are required for some applications, operate at around the 1.2 Mbps mark, which is also sufficient for data and control applications. However, with modern data networks, if more bandwidth is available, the whole network will operate faster.

Commercial communications modems such as wireless LAN modems typically operate with a total Radio Frequency or RF channel attenuation of up to 85 dB. When the use of a near-field antenna and ribbon cable channel is desired there are two attenuation sources which must be considered. The first is a fixed insertion loss from the antenna to the ribbon. In a working system this varies mostly with the horizontal and vertical displacement of the antenna.

Typically this insertion loss will fall into the range of 20 to 35 dB. The second loss is the attenuation per meter of the signal propagating in the ribbon cable. For a 450 ohm ribbon operating at 300 MHz this value is around 0.65 dB/m or 65 dB per 100 m, as noted above.

The insertion loss combined with the attenuation per meter for a 100 m track operating at 300 MHz would be the maximum length over which a communications system would operate as the two attenuations add to approximately 85 dB. This can be increased to 200 m if the ribbon cable is centre fed, meaning that the ribbon extends 100 m in each direction from the connection point. This may be an acceptable, length for many systems but when multiple trolleys are present in this length the total bandwidth must be shared between all of them.

Modern modems provide multi-connection support but quickly become congested with the bandwidth for each connection often decreasing at a rate directly proportional to the number of connections. Wireless LAN modems typically support up to 30 connections at once. However, to get an acceptable high bandwidth performance the number of connections should preferably be limited to 10 connections or less.

It is an object of the invention to provide a communications system and/or method and/or apparatus which takes advantage of a ribbon cable channel and provides high bandwidths to multiple trolleys and various types of IPT systems.

Alternatively, it is an object of the invention to provide at least a useful choice.

According to a first aspect of the invention, there is provided an apparatus for generating and/or transmitting communications signals, the apparatus comprising:
means for generating signals at a first frequency; and
means for mixing the frequency of the generated signals from the first frequency down to a second frequency,
a near field antenna for receiving the signals at the second frequency and being provided sufficiently near to a wire transmission line so as to wirelessly couple the apparatus to the wire transmission line.

The near field antenna (and other ones referred to herein) is preferably adapted to limit electromagnetic radiation therefrom.

The near field antenna preferably comprises an inductance or capacitive element. Where a capacitive element is used, the near field antenna preferably comprises elongate conductors provided on a non-conductive planar substrate. Where an inductive element is used, the near field antenna preferably comprises elongate loops provided on a non-conductive planar substrate. The elongations for both arrangements are preferably configured to be oriented in substantially the same direction as the transmission line or track of an HID/IPT system. Preferably, the substrate is provided with a ground backing plane.

According to the present invention, the transmission line provides a communication path that in principle does not radiate energy. It is preferably terminated with its characteristic impedance to avoid standing waves. Near field antennas may wirelessly transmit or receive (or both) signals in the form of electrical energy to or from the transmission line. Communication signals propagating in/along the transmission line are in principle not disturbed by extraneous electromagnetic radiation, as parallel wire transmission lines neither radiate nor receive radiation. Thus the pathway is resistant to unwanted noise. However, near field disturbances can be coupled into or out of the transmission line using the near field antennas. These are essentially mutual inductances or capacitances that affect the two wires of the transmission line differently. The near field antennas may be configured to have a particular inductance which is coupled to the transmission line by a mutual inductance.

In this document reference to "near field antenna" refers to an antenna designed to operate in the very near field, preferably within approximately ⅙th of a wavelength or 1 radian phase displacement.

Preferably, the second frequency is lower than the first frequency.

Preferably, the means for generating comprises a modem, more preferably, a Wireless LAN (WLAN) modem.

Preferably, the first frequency is approximately 2.4 GHz.

This frequency is preferred because it is the frequency used by most commercially available WLAN modems. However, the invention is not limited thereto as would be apparent to one of skill in the art.

Preferably, the second frequency is within a range of approximately 50 MHz to 500 MHz, and is most preferably approximately 300 MHz.

This range is selected so as to readily enable communications using near-field antennas as will become more apparent hereinafter. However, the invention is not limited thereto and may be applied to signals having other frequencies.

Preferably, the apparatus comprises a local oscillator.

Preferably, the local oscillator is communicatively coupled to the means for mixing.

Preferably, the means for mixing is communicatively coupled to the means for generating.

According to preferred embodiments, the signals generated by the means for generating are combined in the means for mixing with the output of the local oscillator to arrive at the second frequency.

Preferably, the apparatus comprises a filter, such as a low pass filter, for removing or attenuating unwanted frequencies. Preferably, the filter is configured to receive the output of the means for mixing.

Preferably, the transmission line includes a cable having two parallel conductors.

Preferably, the conductors are separated by an insulating web.

Preferably, the cable comprises a ribbon cable, more preferably, a 450 ohm ribbon cable.

Thus, the signals generated by the means for generating at a first frequency are mixed down to a second frequency and then passed to the transmission line, which conveys the signals along a portion of their overall path. The signals are then wirelessly conveyed to a receiver at a third frequency and mixed to a fourth frequency (as will be described more fully below), after which the data contained therein is processed according to known methodology. The first and fourth frequencies are preferably substantially the same or comparable. Similarly, the second and third frequencies are preferably substantially the same or comparable.

According to a second aspect, there is provided an apparatus for receiving signals generated by the apparatus of the first aspect.

Preferably, the apparatus for receiving comprises an antenna configured to receive the signals from the transmission line. Preferably, the antenna is a near field antenna.

Preferably, the signals received by the antenna have a frequency within the range of about 50 MHz to 500 MHz, and more preferably is approximately 300 MHz. Again, the invention is not limited to these particular frequencies.

Preferably, the apparatus includes a modem, more preferably, a WLAN modem.

Preferably, the apparatus includes a mixer for mixing signals received from the apparatus of the first aspect to a frequency, preferably approximately 2.4 GHz, for processing by the modem. Again, the invention is not limited to this frequency but it is preferred where communications are to be made with conventional WLAN modems.

Preferably, the apparatus includes a local oscillator that is communicatively coupled to the mixer to facilitate the appropriate frequency change.

Preferably, a filter (more preferably a low pass filter) is provided to remove or attenuate unwanted frequencies, such as from signals received and output by the antenna.

According to a third aspect, there is provided a communications system comprising an apparatus according to the first aspect communicatively coupleable to an apparatus according to the second aspect.

According to preferred embodiments, an apparatus according to the first aspect may be combined with an apparatus according to the second aspect so as to provide both transmission and reception functionality. As would be apparent to one of skill in the art, the extent of commonality of the components required for each task can be set depending on the performance parameters of any given system. Generally, to reduce size and weight of such a combined apparatus, at least one or all of the mixer, modem, filter and local oscillator are configured to provide both transmission and reception functionality.

Preferably, the system further comprises the transmission line, which is preferably embodied by a ribbon cable.

According to a fourth aspect, there is provided a communications system comprising:
- a transmission line; and
- a plurality of transmitters positioned along the line and communicatively coupled thereto via near field antennas,
- wherein adjacent ones of the transmitters are configured to transmit at a different frequency.

Preferably, at least one of the transmitters is embodied by an apparatus according to the first aspect.

Preferably, each transmitter is associated with a receiver so as to provide both transmission and reception functionalities.

Preferably, the receiver is embodied by an apparatus according to the second aspect. Again, the extent of commonality of components used for transmission and reception may be varied as desired.

According to one embodiment, each transmitter is configured to transmit signals on a first or a second frequency, such that one transmitter transmits on the first frequency and its adjacent transmitters transmit on the second frequency, such that there is no or no effective overlap or limited interference between transmissions on any one frequency from multiple transmitters. A similar configuration is preferably used for the receivers. More preferably, particularly for embodiments which make use of WLANs, the same or essentially the same circuitry and/or components are used for both transmitting and receiving.

This creates communications cells along the transmission line, each cell having its own data capacity and thus enabling the total capacity along the transmission line to be much higher than if a single signal source or frequency was used for the entire transmission line.

Additional frequencies may be used, including on an ad hoc basis as required depending on traffic levels and the like so as to change the data capacity of the cells formed by each transmission zone of a particular frequency.

Preferred embodiments of the invention vary the cell size depending on a level of demand. The level of demand of data exchange may be determined according to means and methods known to those in the art and include measures of estimated and/or actual and/or predicted demand.

Preferably, the cell size is varied by varying the frequency which the signals are mixed down to. Reducing this frequency increases the cell size and increasing the frequency reduces the cell size. Thus, somewhat counterintuitively, increasing the attenuation increases the bandwidth by reducing the number of stations with which signals are exchanged in each cell.

According to preferred embodiments, the apparatus of the first and/or second aspects and/or the system of the third and/or fourth aspects, is configured for use with an inductive power transfer (IPT) system. According to such embodiments, a conductor in addition to the wire transmission line is configured to provide power to carriers or other moveable units in the IPT system. The conductor preferably follows substantially the same path as the wire transmission line.

According to a fifth aspect, there is provided a method of generating communications signals, the method comprising:
generating signals at a first frequency;

mixing the frequency of the generated signals from the first frequency down to a second frequency; and transmitting the signals to a wire transmission line via a near field antenna.

Preferably, the method comprises conveying the signals along at least a portion of the transmission line.

According to a sixth aspect, there is provided a method of receiving signals that have been generated in accordance with the method of the fifth aspect and/or by the apparatus of the first aspect.

Further aspects of the invention, which should be considered in all its novel aspects, will become apparent to those skilled in the art upon reading the following description which provides at least one example of a practical application of the invention.

BRIEF DESCRIPTION OF THE DRAWINGS

One or more embodiments of the invention will be described below by way of example only and without intending to be limiting with reference to the following drawings, in which.

DETAILED DESCRIPTION OF PREFERRED EMBODIMENTS

Figure 1:
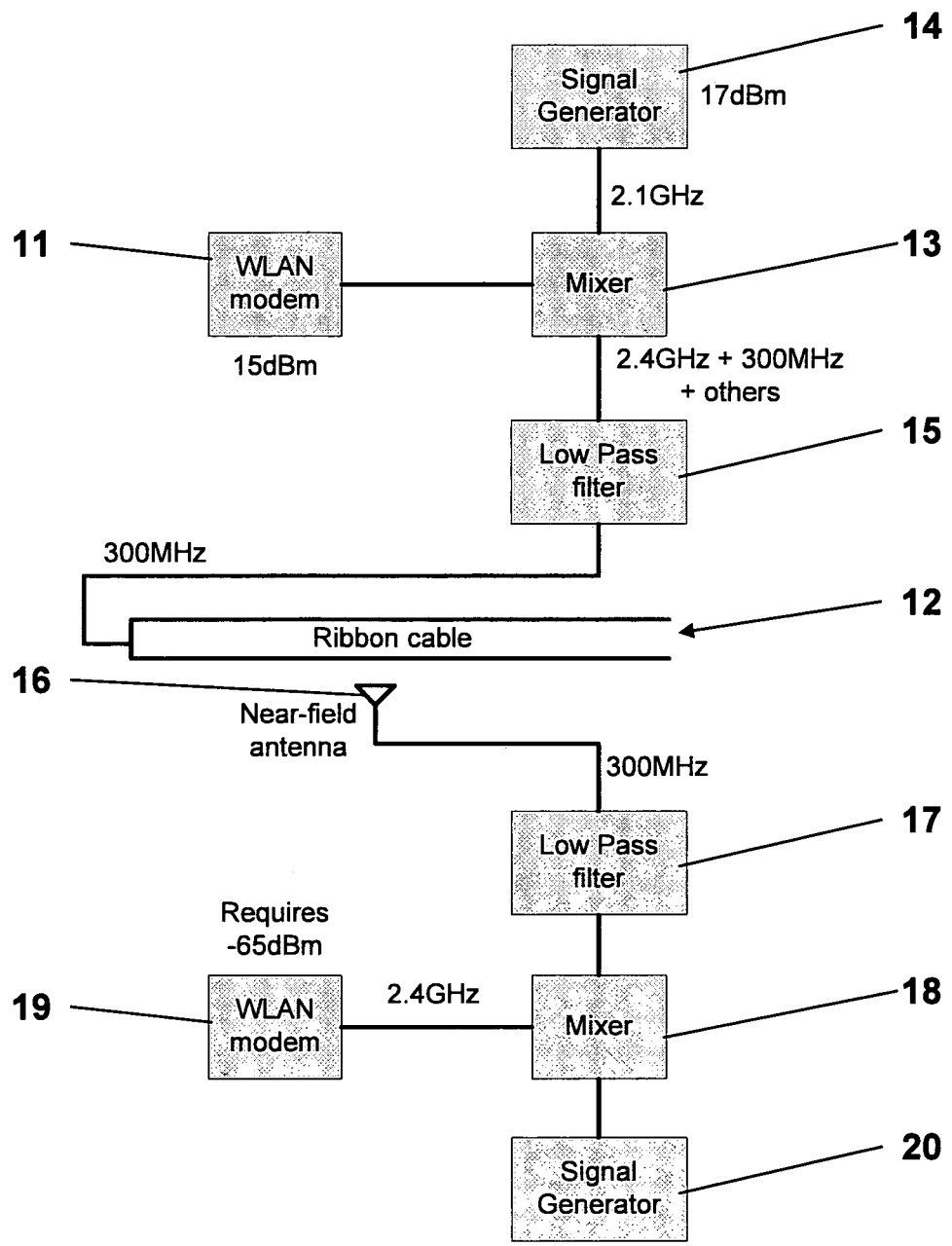
FIG. 1 is a schematic diagram showing elements used in a mixing process according to an embodiment of the invention.

In broad terms, the invention provides novel cellular based communications and according to preferred embodiments, an IPT system which makes use of such communications.

Preferred embodiments of the invention provide a high bandwidth communications system by making use of two new concepts. The first is the development of 2.4 GHz Wireless LAN (WLAN) modems, which are preferably mixed down to 300 MHz. The second most surprisingly involves taking advantage of the attenuation per meter of the ribbon cable to provide a cellular-based system with frequency reuse as will become more apparent hereinbelow.

Mixing the WLAN modems down in frequency to between approximately 50 MHz and 500 MHz allows proper use on the ribbon cable channel. Additionally WLAN modems have built in multi-connection support and operate on one of 14 selectable channels. Unfortunately these channels overlap in frequency but three can be used with no frequency overlap. Any given modem can only operate on one channel at once. Embodiments of the invention operating in accordance with the above parameters preferably limit the number of connections to each modem to approximately 10 or less at any one time to keep the system performance within acceptable limits, namely, as high as possible. It will be apparent to one of skill in the art that various factors will affect the allowable number of connections for any given system, including but not limited to the allowable latency or delay in the transfer of data and the expected amount of data to be transferred to/from each station (i.e., trolley) within the system.

Due to the controllable attenuation per meter of the communications signal in the ribbon cable a staggered system of alternating WLAN channels can be designed such that by the time the same WLAN channel is reused, the signals on the same WLAN channel from nearby segments is low enough that they will not interfere with the current segment. The length of the repeating "cellular" sections is controlled by the chosen frequency which the 2.4 GHz Wireless LAN gets mixed down to as this controls the attenuation per meter in the ribbon.

An advantage of using conventional WLAN modems is that they automatically deal with network security and the "handoff" or "handover" as trolleys make their way between various cellular sections.

There follows a description of two core aspects of embodiments of the invention. Firstly, an explanation of the novel mixing process of WLAN modems and secondly, the novel cellular structured communications system.

WLANs enable high speed data communications based on the IEEE 802.11 standard. WLAN modems generally operate at 2.4 GHz with the notable exception of those in accordance with 802.11a which operate at 5 GHz. The two main variants widely in use today are 802.11b and 802.11g, which support data speeds up to 11 Mbps and 54 Mbps, respectively. These data rates are the speeds at which the physical channel is operating and in the case of 802.11g, the best computer to computer data rate achievable is in the order of 15 to 18 Mbps.

The use of WLAN modems in embodiments of the invention is attractive as they are widely available at low cost but the invention is not limited thereto. They interface with standard Ethernet which allows a huge base of applications to be used and any custom applications required largely become a software development problem with the communications link acting almost like a virtual wire. Additionally the modems have built in error correction and automatic speed control depending on the physical operating conditions.

However, conventional modems operate at 2.4 GHz which is out of the 50 MHz to 500 MHz operating range for a ribbon cable channel. To overcome this, the WLAN modems according to preferred embodiments of the invention have their output signal mixed down into the range of 50 to 500 MHz and preferably to approximately 300. MHz. This signal is then preferably sent through the physical channel (ribbon) and mixed back up to 2.4 GHz before being fed into the other, receiving modem.

FIG. 1 is a block diagram illustrating an embodiment of the mixing process of the invention, in which the 2.4 GHz operating frequency of WLAN modem ills mixed down to 300 MHz for transmission along ribbon cable 12. The mixing down process centres around RF mixer 13 and uses local oscillator 14. The output signal thus consists of the original input frequency, the sum and difference of local oscillator 14 and input frequencies, and some harmonic content.

The output power of WLAN modem 11 is 15 dBm and is fed directly into mixer 13. Local oscillator 14 running at 2.1 GHz with a power of 17 dBm is also fed into mixer 13. It is important to keep local oscillator 14 power level higher than the input signal by as much as practically possible to minimise inter-modulation by-products. The difference between the 2.4 GHz input and the 2.1 GHz local oscillator signal is the desired 300 MHz signal to inject into ribbon 12, however it is first put through low pass filter 15 with a 3 dB cut-off frequency of 550 MHz to remove any higher frequency content.

The signal is received by antenna 16 and processed by low pass filter 17, mixer 18, WLAN modem 19 and local oscillator 20 in a reciprocal process to that on the transmission side, as would be apparent to one of skill in the art to enable the system, in accordance with preferred embodiments, to be fully bi-directional.

The output power of WLAN modems is typically specified at 15 dBm and to run at 54 Mbps, the required received signal strength needs to be −65 dBm. The effects of the mixing process and the physical ribbon channel are illustrated in Table 1 below which provides a link budget for an embodiment of the invention.

TABLE 1

2.4 GHz-300 MHz Link budget

|  |  |  | UNITS |
|---|---|---|---|
| Input power |  | 15* | dBm |
| Mixer | 8* |  | dB |
| LP Filter | 1* |  | dB |
| OUTPUT POWER |  | 6 | dBm |
| AVAILABLE 300 MHZ Loss |  | 62 | dB |
| Track Coupling | 30* |  | dB |
| AVAILABLE Attenuation |  | 32 | dB |
| Attenuation Rate | 0.65* |  | dB/m |
| WORKING distance (one way) |  | 49 | m |
| WORKING distance (center fed) |  | 98 | m |
| REQUIRED INPUT |  | −56 | dBm |
| LP filter | 1 |  | dB |
| Mixer | 8 |  | dB |
| Power required |  | −65* | dBm |

*= variables

As can be seen in Table 1, after the mixing down process the power available for injecting into the ribbon cable is 6 dBm. Reciprocally, considering the mixing up process, the required received signal strength from the ribbon track is −56 dBm leaving 62 dB of available loss for the physical channel. The track coupling has a fixed 30 dB (or so) and the remaining loss or gain margin is used to calculate the operational length of the system. Injecting the signal at one end of the track the operational length is 49 m in this example and 98 m (double) if the ribbon is centre fed. Note that the system is fully bi-directional.

An embodiment of the mixing system of the invention has been tested using fixed attenuators to represent the ribbon cable and near-field antenna. This was done so that the frequency mixing aspect could be thoroughly evaluated to find out how it is influenced by various aspects of the mixing process. This included attenuation as a result of the ribbon coupling and propagation losses, the presence of low pass filters, the required frequency accuracy of the local oscillators, and finally the output power of the local oscillators.

Figure 2:
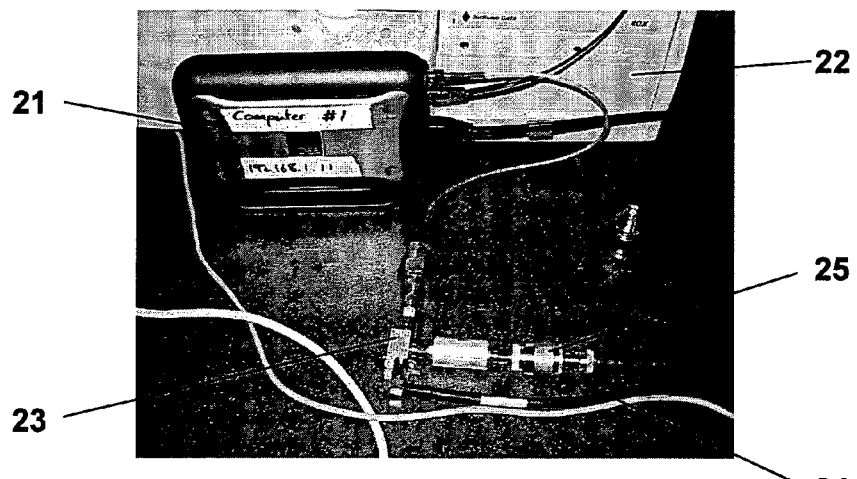
FIG. 2 is an illustration of a mixing circuit.

One mixing circuit is shown in FIG. 2. WLAN modem 21 and computer 22 which drives it are visible in FIG. 2. Mixer 23 is fed by modem 21 and a local oscillator via lead 24. The output from mixer 23 passes through a low pass filter and then to the attenuators representing the ribbon and coupling losses via coax 25.

Figure 3:
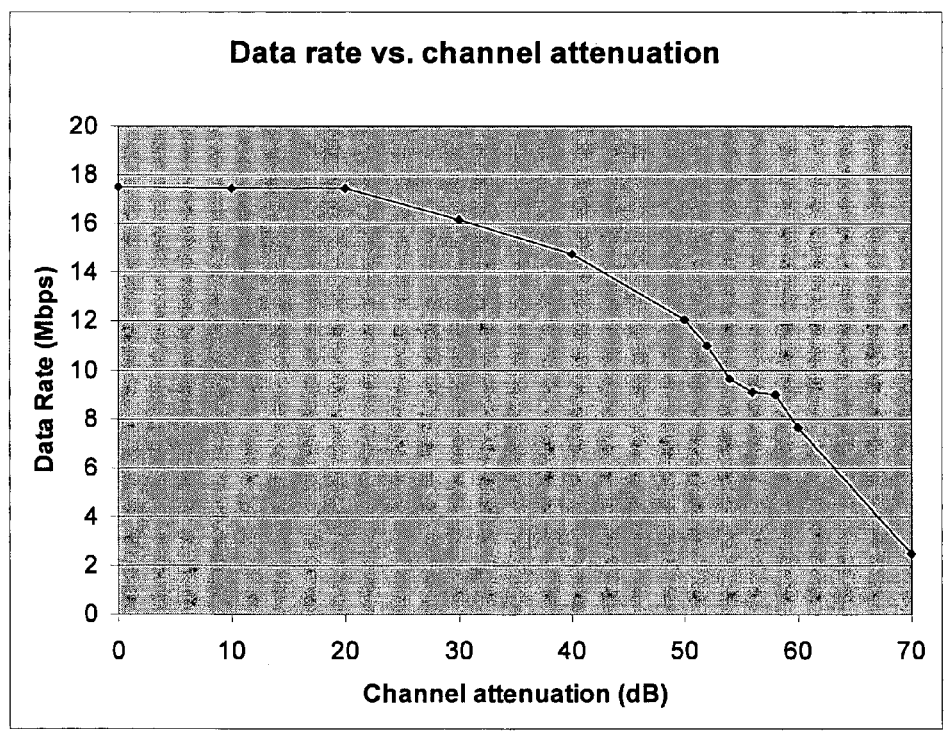
FIG. 3 is a chart of channel attenuation against data rate.

The results of tests obtained using the circuit of FIG. 2 are presented in the graph of FIG. 3, in which channel attenuation—which represents the ribbon cable insertion loss combined with the propagation loss (dB)—is plotted against data rate (Mbps) for WLAN modems mixed down from 2.4 GHz to 300 MHz. The circuit of FIG. 2 is set up as described in relation to FIG. 1 and the link budget of Table 1.

Referring to the graph of FIG. 3, it can be seen that a data rate of up to around 18 Mbps can be achieved. Additionally, a data rate of at least 10 Mbps can be achieved up to a channel attenuation of 52 dB, but the system will keep on working up to an attenuation of approximately 70 dB. As a comparison, when using conventional WLAN modems with no mixing and using the antennas normally provided, the maximum data rate measured was also 18 Mbps.

Figure 4:
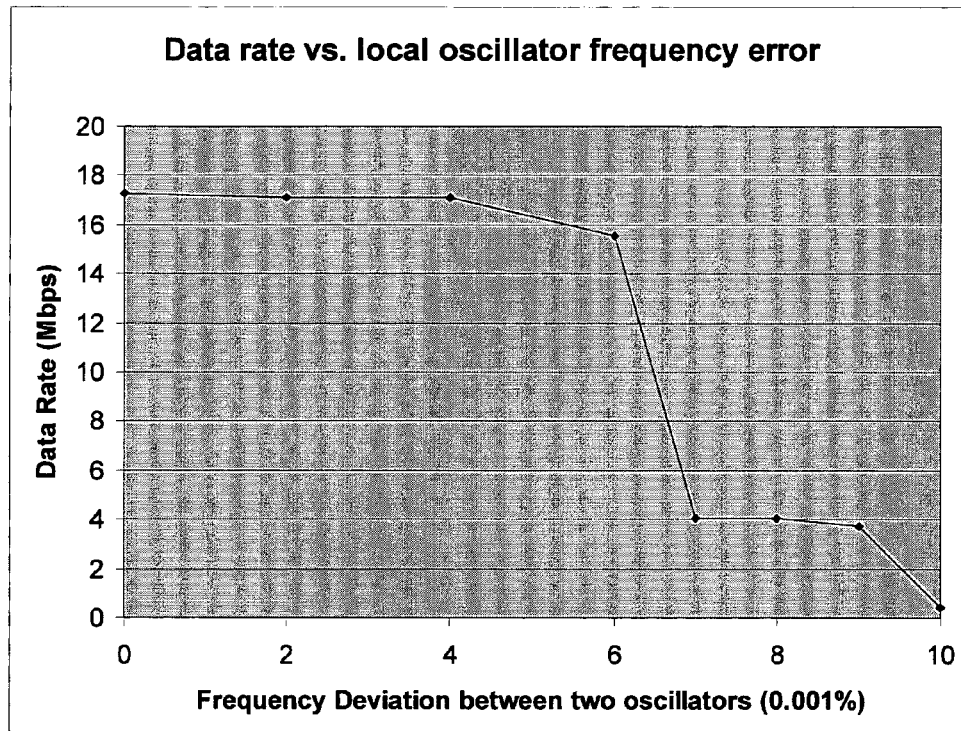
FIG. 4 is a chart of channel attenuation against data rate for a system having a frequency deviation between the local oscillators on the transmission and reception sides.

The graph of FIG. 4 illustrates the impact on the data rate when the frequency of one of the local oscillators is varied relative to the other (i.e., the local oscillator on the transmission side is varied relative to the local oscillator on the reception side, or vice versa). The graph shows frequency drift as a percentage from the ideal 2.1 GHz against data rate. As can be seen from FIG. 4, the data rate is not noticeably affected until there is at least a 0.005% error in frequencies. Keeping the error under this level is easily attainable with modern oscillators.

Thus embodiments of the invention provide for the mixing down of, preferably but not limited to, WLAN modems which normally operate at 2.4 GHz to 300 MHz to allow them to be used on a near-field antenna and ribbon cable communications channel. Fixed losses in the up and down frequency mixing processes leave an available channel attenuation of 62 dB according to one embodiment. This attenuation is made up of the fixed insertion loss from the near-field antenna to the ribbon cable and the working attenuation of the ribbon cable, expressed in dB per meter.

By choosing the frequency of the local oscillators, the frequency which the WLAN modem signal is mixed to can be varied and for use on a ribbon system this should preferably be between 50 MHz to 500 MHz. The mixed down system has been tested using fixed attenuators to represent the channel losses and it was found that a maximum data rate of 18 Mbps can be achieved while at least 10 Mbps can be achieved right up to a channel attenuation of 52 dB. The system does not fail until approximately 70 dB of attenuation is reached.

Discussion now turns to the cellular communications aspect of the invention.

Under normal operation WLAN modems acting as base stations support multiple connections (normally about 10 while still maintaining reasonable data rates). However, with each additional connection the available data rate to each device decreases as well as the reliability of getting a low latency connection when required. This is particularly important when the network is being used for high data volume, time sensitive applications such as streaming video feeds. As an example a high resolution network camera runs at 1.2 Mbps and if it misses too many packets due to high latency, the video stream freezes and it can take up to 3 seconds to re-establish the real-time feed.

As previously mentioned WLAN modems have 14 available channels on which to operate. Three of these do not overlap. This means that by using the abovementioned 300 MHz frequency mixing technique for WLAN modems, three independent channels exist, all of which is close to the mixed down 300 MHz frequency. Additionally, the WLAN modems will automatically choose to operate on the best one of these three channels and will seamlessly switch between them. These channels can be thought of as channels A, B, and C, and can be mixed down so that they are all close to 300 MHz, 50 MHz, 450 MHz or whatever frequency is required for a desired ribbon cable and desired attenuation per meter.

Figure 5:
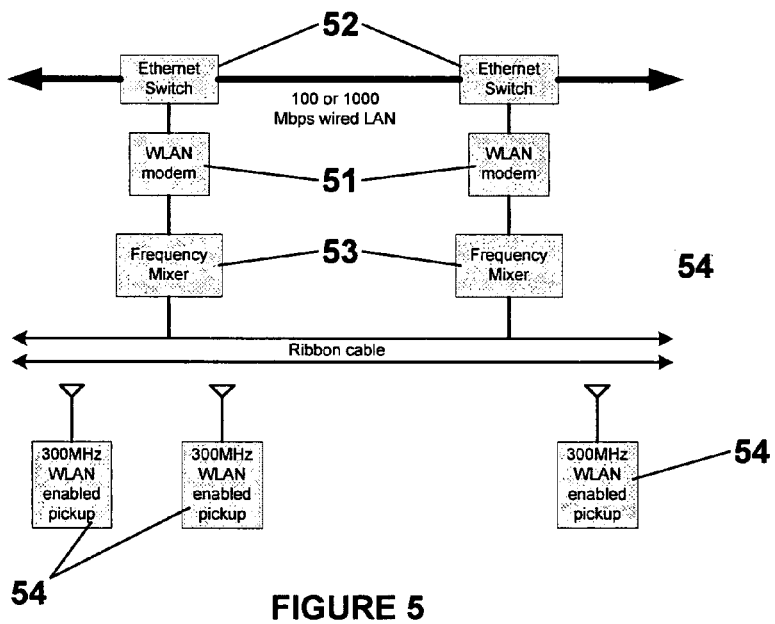
FIG. 5 is a schematic representation of an embodiment of the invention.

According to preferred embodiments of the invention adapted for a monorail system, the ribbon is segmented into lengths depending on the frequency to which the WLAN is mixed down. It should be noted that segmenting the ribbon cable refers to frequency segmentation not physical segmentation. Physically speaking, the ribbon will have a continuous length terminated at each end in its characteristic impedance. As an example, note that for the 450 ohm ribbon cable channel with signals at 300 MHz the attenuation per meter was 0.65 dB. The link budget in Table 1 shows that by centre feeding the ribbon cable, the maximum workable length was 98 m, or 49 m in each direction. FIG. 5 is a schematic representation of such a system in accordance with one embodiment of the invention.

As can be seen in FIG. 5, WLAN modems 51 are preferably connected to normal wired LAN switches 52 which provide a data backbone for the whole system. This backbone could operate at 1 Gbps or 100 Mbps or any other desired data rate and preferably includes a twisted pair cable running the length of the IPT system into which the communication system may be incorporated. Since all of these wired components are widely available, it is a very low cost system to implement. Power could be provided by another cable or taken from the IPT power system, where applicable. Note that while embodiments of the cellular communications aspect of the invention are particularly well suited for use with IPT systems since the IPT system may provide power as well as a portion of the means for communication (and IPT systems often require means of communication), the invention is not limited thereto. More particularly, as will be apparent to one of skill in the art, the communications aspect of the invention may be implemented absent from any IPT equipment or functionality.

Both frequency mixers 53 are preferably set to mix 2.4 GHz down to 300 MHz. However, one modem 51 would be set to use channel A and the second one channel B. WLAN enabled pickups 54 are preferably able to move freely along ribbon cable 55 and depending on where they are located, their associated WLAN modems would automatically choose the best channel to operate on, either A or B.

Due to the natural dispersion of carriers in, for example, an IPT system there will only be a small number of carriers in any segment of ribbon at once. This keeps data rates (bandwidth) to each carrier high and minimises data latency. If there is part of the system where carriers queue or if higher data bandwidths are desired, smaller ribbon segments can be used to maintain the system integrity.

To get smaller ribbon segments, the frequency which the 2.4 GHz is mixed to would need to be increased. This would result in a higher attenuation per meter of the signal in the ribbon cable and hence shorter segments as the working distance of each segment would consequently be smaller. Table 2 shows the segment lengths for different mixed down frequencies which have been tested on a 450 ohm ribbon channel. However, any frequency between approximately 50 MHz and 500 MHz could be used. However, commonly the same frequency is used for the whole of any given system. This 50 to 500 MHz frequency range is primarily controlled by the operational frequency range of the near-field antennas and the ribbon cable.

TABLE 2

| Mixed Down Frequency | Segment length |
| --- | --- |
| 50 MHz | 337 m |
| 150 MHz | 213 m |
| 250 MHz | 182 m |
| 300 MHz | 98 m |
| 450 MHz | 71 m |

An additional advantage of particular embodiments is that it is possible to identify which segment any particular carrier is located in since each carrier preferably has an IP address or other identifier which can be traced through the WLAN modem driving a ribbon cable segment. This also means that not all of the IPT track needs to have ribbon as a carrier can be told to move somewhere and when it gets to an area with ribbon its link will automatically become active, indicating its arrival.

Figure 6:
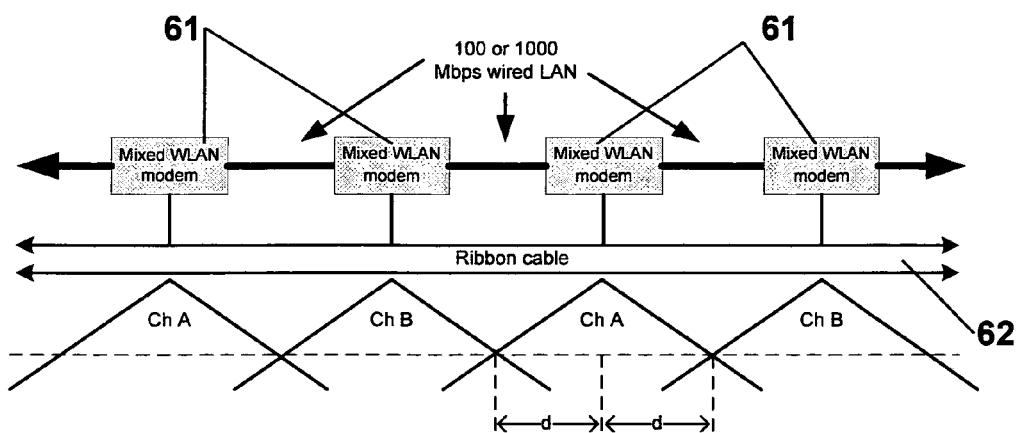
FIG. 6 is a schematic representation illustrating frequency re-use according to an embodiment of the invention.

Similar to the manner in which a cellular phone network operates, the reuse of available working spectrum is desirable and moreover is achievable according to embodiments of the invention. For preferred applications of the invention involving a monorail arrangement, the network is essentially one-dimensional (i.e., carriers may only move along the length of the rail). As previously indicated, 3 channels (referred to herein as channels A, B, and C) are available where conventional WLAN modems are used and no frequency overlap is selected. FIG. 6 shows the frequency reuse of a system using only two channels, channels A and B.

As can be seen in FIG. 6, channels A and B are alternated along the length of the communications system (i.e., the ribbon cable). Only four segments are shown but it will be appreciated that any number of segments may be included. Mixed, preferably WLAN, modems 61 are preferably connected to each other by a wired high speed network and are all mixed down to a common frequency. Other configurations will be apparent to one of skill in the art and are included within the scope of the invention. It should be noted that the WLAN modems and frequency mixers are shown in FIG. 6 as one combined block. For preferred implementations, all components of the frequency mixer, including the local oscillator, and WLAN modem would be combined onto a single circuit board. This provides a significant cost and size reduction.

If it was desired to use all three of the non-overlapped WLAN modem channels (A, B, and C) then the pattern along the system would be ABCABCABC instead of ABABABAB. The main advantage of this would be for a better signal to noise ratio on a segment per segment basis as the reuse of say channel A would not occur until 3 segment lengths away as opposed to two, reducing the amount of interference therebetween.

The main advantage of using the two channel WLAN modem channel pattern (e.g. ABABAB) is that the C channel can be kept in reserve for high demand areas of the system. This could be in locations where trolleys may queue or where there is a demand for a much higher bandwidth for each trolley. At any point along the ABAB segmented system, a mixed WLAN modem 61 operating on channel C can be added to the ribbon cable 62. It does not need to line up with the existing A or B segments and can be superimposed on top of either the A or B channels (or overlap both). In keeping with the cellular nature of the system, channel C can also be reused at different locations on the system as long as there is enough separation between them.

In FIG. 6, the length 'd' is half of the segment length. It is presented in this way as it is easy to envisage the system if the WLAN modems are thought to be centre feeding each segment of ribbon cable. Again, this segment length (2*d) can be controlled by the frequency which the 2.4 GHz WLAN modems are mixed down to.

It will be appreciated that while the preferred implementation of the invention involves an essentially one-dimensional system, the invention is not limited thereto. Not only may a track deviate from a straight line but carriers (or moreover, the communications pickups) within the system may be moveable in directions other than, or other than solely, along a track.

Unless the context clearly requires otherwise, throughout the specification, the words "comprise", "comprising", and the like, are to be construed in an inclusive sense as opposed to an exclusive or exhaustive sense, that is to say, in the sense of "including, but not limited to".

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. An apparatus for generating and/or transmitting communications signals, the apparatus comprising:
   a generator for generating a WLAN modem signal at a first frequency;
   a mixer for mixing the frequency of the generated signal from the first frequency down to a second frequency prior to transmission of the signal at the second frequency over a wire transmission line; and
   a near field antenna for receiving the signal transmitted at the second frequency and being provided sufficiently near to the wire transmission line so as to wirelessly couple thereto.

2. The apparatus of claim 1, wherein the first frequency is approximately 2.4 GHz and/or the second frequency is within a range of approximately 50 MHz to 500 MHz.

3. The apparatus of claim 1, wherein the transmission line comprises a 450 ohm ribbon cable.

4. The apparatus of claim 1, comprising and/or electrically coupled to a pickup, the pickup being configured to receive power by inductive power transfer.

5. A communications system comprising:
   a receiving apparatus for receiving signals generated and/or transmitted by a transmission apparatus for generating and/or transmitting communications signals, the transmission apparatus comprising:
   a generator for generating a WLAN modem signal at a first frequency;
   a mixer for mixing the frequency of the generated signal from the first frequency down to a second frequency prior to transmission of the signal at the second frequency over a wire transmission line; and
   a near field antenna for receiving the signal transmitted at the second frequency and being provided sufficiently near to the wire transmission line so as to wirelessly couple thereto.

6. The communications system of claim 5, wherein the antenna is configured to receive signals having a frequency within the range of about 50 MHz to 500 MHz and the antenna is a near field antenna.

7. The communications system of claim 5, further comprising a second mixer for mixing the received signals to a third frequency.

8. The communications system of claim 7, wherein the third frequency is approximately 2.4 GHz.

9. The communications system of claim 5, comprising and/or electrically coupled to a pickup, the pickup being configured to receive power by inductive power transfer.

10. The communications system of claim 5, further comprising a plurality of transmission apparatuses for transmitting arranged such that adjacent ones of the plurality of transmission apparatuses for transmitting are configured to generate and/or transmit signals with different frequencies creating communications cells.

11. The communications system of claim 10, wherein the plurality of transmission apparatuses comprise first, second and third apparatus for transmitting, arranged such that the second apparatus is positioned between the first apparatus and the third apparatus, wherein the first and third apparatus are configured to generate and/or transmit signals having one frequency and the second apparatus is configured to generate signals having a different frequency, thereby providing communications cells.

12. The communications system of claim 10, wherein the mixer is configured to adjust the second frequency depending at least in part on:
   an actual and/or estimated and/or predicted traffic level at at least one of said transmission apparatuses for transmitting; and/or
   an actual and/or estimated and/or predicted traffic level at at least one said apparatus for receiving; and/or
   an actual and/or estimated and/or predicted traffic level at at least one point on the transmission line.

13. The communications system of claim 12, wherein the mixer is configured to increase the second frequency if the actual and/or estimated traffic level exceeds a threshold thereby reducing the cell size.

14. The communications system of claim 13, wherein the threshold is selected to prevent the actual and/or estimated traffic levels exceeding the available capacity.

15. The communications system of claim 12, further comprising a system for deriving the one or more traffic levels.

16. A method of generating and/or transmitting communications signals, the method comprising:
   generating a WLAN modem signal at a first frequency;
   mixing the frequency of the generated signal from the first frequency down to a second frequency prior to transmission of the signal at the second frequency over a wire transmission line; and
   receiving the signal transmited at the second frequency via a near field antenna that is provided sufficiently near to a the wire transmission line to wirelessly couple the near field antenna to the wire transmission line.

17. The method of claim 16, comprising transmitting first and second sets of signals having the second frequency to first and second portions of the transmission line, respectively, wherein there is substantially no overlap between the first and second portions.

18. The method of claim 17, comprising:
   mixing the frequency of the generated signals from the first frequency down to a third frequency that is different to the second frequency; and
   transmitting the signals having the third frequency to the transmission line.

19. The method of claim 18, wherein the signals having the third frequency are transmitted to a third portion of the transmission line, the third portion being positioned between the first and second portions, and the first portion overlaps the third portion and/or the second portion overlaps the third portion.

20. The method of claim 18, comprising:
   handing over communication using the first set of signals at the second frequency to the signals at the third frequency; and/or
   handing over communication using the signals at the third frequency to the second set of signals at the second frequency.

* * * * *